United States Patent [19]

Wu et al.

[11] Patent Number: 6,103,007
[45] Date of Patent: Aug. 15, 2000

[54] INORGANIC RESIN COMPOSITIONS, THEIR PREPARATION AND USE THEREOF

[75] Inventors: Xiao Wu; Jun Gu, both of Brussels, Belgium

[73] Assignee: Vrije Universiteit Brussel, Bussels, Belgium

[21] Appl. No.: 09/077,005

[22] PCT Filed: Nov. 17, 1995

[86] PCT No.: PCT/BE95/00106

§ 371 Date: Jul. 10, 1998

§ 102(e) Date: Jul. 10, 1998

[87] PCT Pub. No.: WO97/19033

PCT Pub. Date: May 29, 1997

[51] Int. Cl.⁷ .................................................. C04B 28/34
[52] U.S. Cl. ................... 106/690; 106/18.12; 106/18.14; 106/691; 106/286.1; 106/286.2; 106/286.3; 106/286.4; 106/286.5; 106/286.8; 106/287.1; 106/287.29; 106/287.3; 427/397.7
[58] Field of Search .............................. 106/18.12, 18.14, 106/690, 691, 286.1, 286.2, 286.3, 286.4, 286.5, 286.6, 286.8, 287.1, 287.29, 287.3; 427/397.7

[56] References Cited

U.S. PATENT DOCUMENTS 3,804,651  4/1974  Semler ..................................... 106/690
4,792,359  12/1988  Barrall et al. ........................... 106/691

FOREIGN PATENT DOCUMENTS 2 291 951  6/1976  France .
23 56 524  5/1975  Germany .
30 43 856  6/1982  Germany .
2 100 246  12/1982  United Kingdom .

OTHER PUBLICATIONS

Hitachi Chemical Co., "Inorganic Binder For Mica Plate Manufacture," Dec. 26, 1983, *Chemical Abstracts*, vol. 99, No. 26.

Zhou Wenbin, "Inorganic Binder For Manufacturing Mica Sheets," Nov. 26, 1990, *Chemical Abstracts*, vol. 113, No. 22.

*Primary Examiner*—Anthony Green
*Attorney, Agent, or Firm*—Jacobson, Price, Holman & Stern, PLLC

[57] ABSTRACT

Inorganic resin compositions comprising, in combination, an aqueous solution of metal phosphate, an oxy-boron compound, a wollastonite compound and other optional additives, inorganic composite articles and products reinforced by fillers and fibers including glass fibers obtained from these compositions and processes for preparing said products.

31 Claims, No Drawings

INORGANIC RESIN COMPOSITIONS, THEIR PREPARATION AND USE THEREOF

BACKGROUND OF THE INVENTION

1. Technical Field

This invention relates to inorganic resins in composition of aqueous solution of inorganic metal phosphate, oxy-boron compound and wollastonite compound; to various additives for said composition; to processes for forming said resin and the resin product; to products manufactured by said resin composition and said process. The unique feather of this invention is that pot life of the fresh resin and temperature increase of the resin during setting reaction can be controlled so that its pot life can be between few minutes to an order of magnitude of several hours or longer; whereas hardened resin and resin product have good material properties and wide range of use. Both cellular and non cellular structures can be obtained.

The resin of the present invention can be used as adhesives and binders. In terms or properties, inorganic resin of the present invention and its products lies between those such as e.g. Portland cement and those such as e.g. technical ceramics. Fresh mixture or the resin has low viscosity, is storable at low temperatures and easy to use; while the hardened resin is strong, durable, resistant against mild acid attack, fire-proof, and stable at high temperatures. It is suitable to make, such as but not limited, adhesives, binders, coatings and inorganic composites reinforced by fillers and fibres including all glass fibres, used both at low and high temperatures.

2. Description of the Related Art

Wollastonite has been employed not long time ago as primary material in phosphate cement compositions. Only few formulations are known in that field so far, they all have quick setting characteristics. Hardening of these compositions usually occurs at ambient condition in a range from several minutes to ca 10–20 minutes after forming of the cement, which is practically-impossible to be used in applications such as that of composite materials. Large amount of heat production is another typical phenomenon of the traditional phosphate cements which may produce defects inside of the material and affects negatively on material properties. When wollastonite is employed as primary material in the composition, the quick setting may result in extra voids and cracks in structure of the material due to formation of $CO_2$ during the setting process produced by decomposition of calcite ($CaCO_3$) contained in the wollastonite, which further undermines strength and durability of the material. U.S. Pat. No. 3,804,651 dated Apr. 16, 1974 to C. E. Semler discloses a quick setting gel binder of phosphate solutions and wollastonite. The cured binder shows a good mechanical strength and durability, but its fresh mixture gels quickly and is claimed as a quick setting composition. U.S. Pat. No. 4,375,516 dated Mar. 1, 1983 to Jeffery L., Barrall et.al discloses a material in composition of aluminium phosphate solution and solid component containing wollastonite. This composition usually sets in several minutes in the temperature range of 4–25° C. U.S. Pat. No. 4,792,359 dated Dec. 20, 1988 to Jeffery L., Barrall et.al discloses a method to prepare composite materials by hot pressing the mixture of phosphate cement and varies fibres at about 85° C. under pressures, which takes advantage of the quick setting.

As a summary, these inorganic phosphate compositions are found not related to this invention. In terms of composition, no oxy-boron compound is used to extend pot life of these phosphate cement compositions; in terms of setting time, all available compositions has a quick setting; in terms of pot life during which period the mixture keeps flowable, no information is available probably due to the quick setting; in terms of application, all available compositions is used for purposes which needs quick setting.

The inorganic resins of the present invention have a controllable pot life and temperature increase in its fresh state; and have good material properties for the hardened resin, such as, e.g., good mechanical strength, durability, resistance against mild acid attack, high scratch hardness, non flammability, high temperature resistance, and good adhesion with other materials such as fibres including glass fibres,

SUMMARY OF THE INVENTION

The inorganic resins of the present invention are formed basically by reactions between three components, either physically separated or mixed or in combination thereof. The component A is an aqueous solution of metal phosphate preferably selected from the group consisting of aluminium phosphates, zirconium phosphates, magnesium phosphates, zinc phosphates, calcium phosphates, iron phosphates, including derivatives and mixtures thereof. It should be understood that the term solution of the component A is used broadly herein to include aqueous reaction mixtures, and the term derivative of metal phosphates herein includes all types of phosphate such as polyphosphate and dihydrogen phosphate. The component B comprises oxy-boron compound including its hydrates. The component C comprises wollastonite compound. Fillers and fibres including glass fibres can be introduced to the inorganic resin of this invention to improve material properties. Cellular structures of the inorganic resin can be produced by employing foaming agents and surfactants.

Being formed by contacting all ingredients together by way of such as intermixing, fresh resin of this invention has an adjustable pot life in the range from several minutes to an order of magnitude of several hours or longer, and correspondingly a setting time from few minutes to several hours or longer at ambient temperatures; has a controlled temperature increase during setting reaction; while the hardened resin has very good material properties. The composition of the present invention interacts and is able to set without the use of externally applied heat. These compositions and their unique characteristics such as the extended pot life distinguish themselves from the other traditional phosphate cements in the related field. Hardened resin of this invention has a three dimensional network structures. Due to this nature, inorganic resins of the present invention are formulated to be essentially strong, durable, resistant against environmental attack such as acid rain, non flammable, and stable at high temperatures.

Inorganic resin of this invention has good adhesion with fibres, meanwhile it shows no attack against fibres including glass fibres. Accordingly qualified inorganic composites can be produced by this invention. Products made by inorganic resin of this invention can replace at least a portion of presently known products based on organic resins, traditional cements and ceramics in a wide range of applications, such as, fibre reinforced composite products; moulded configurations in cellular and non-cellular structures; thermal, electrical and/or acoustical insulations; binders and adhesives; coatings and or surfacing agents; patching compositions and the like. Further, the use of inexpensive materials and easy processing compared to that of typical organic resins or ceramics offers a number of advantages over many of the organic resins and ceramics destined for similar applications.

It is therefore one objective of the present invention to provide a range of inorganic resin compositions with the above mentioned feathers and advantages.

Another objective of the present invention is to provide processes to prepare these resin compositions and resin products, as well as the use thereof.

These and other objectives and advantages of the present invention will become apparent from, the detailed description given hereafter by way of non limiting examples.

DETAILED DESCRIPTION OF THE INVENTION

The inorganic resins of the present invention are formed basically by reactions between three components, either physically separated or mixed or in combination thereof. The component A is an aqueous solution of metal phosphate preferably selected from the group consisting of aluminium phosphates, zirconium phosphates, magnesium phosphates, zinc phosphates, calcium phosphates, iron phosphates, including derivatives and mixtures thereof. It should be understood that the term solution of the component A is used broadly herein to include aqueous reaction mixtures, and the term derivative of metal phosphates herein includes all types of phosphate such as polyphosphate and dihydrogen phosphate. The component B comprises oxy-boron compound including its hydrates. The component C comprises wollastonite compound including natural and synthetic wollastonite, in calcined or non-calcined state. Fillers and fibres including glass fibres can be introduced to the inorganic resin of this invention to improve material properties. Cellular structures of the inorganic resin can be produced by employing foaming agents and surfactants. Having homogeneously mixed, the said components interact in a controlled way so that designed pot life and setting time can be obtained. Setting process of said inorganic resin is in general exothermic, but the temperature increase of the resin during the reaction can be controlled. Inorganic resin of this invention may set at ambient temperatures to form a strong, durable monolithic mass without applying external heat.

In accordance with this invention, the most important ingredient to prepare the component A is phosphoric acid aqueous solution including but not limited, e.g., ortho-phosphoric acid, pyro-phosphoric acid and polyphosphoric acid, used either alone or in combination thereof. Phosphoric acid is commercially available, with the 85 percent by weight being the most common concentration for the ortho-phosphoric acid. Other phosphorous based acids may also be satisfactory to practice the present invention, providing that the overall water content of the reaction system is not too high. As a general rule, the phosphoric acid will be suitable if it contains the phosphorous, expressed as $P_2O_5$, in range of 14 to 135 parts by weight with respect to 100 parts by weight of wollastonite in the component C, with 24 to 86 parts by weight being preferred.

To practice the present invention, metal phosphate which is relatively insoluble in water is preferred to be used in the component A. It is found that metal phosphate selected from the group consisting of aluminium phosphates, zirconium phosphates, magnesium phosphates, zinc phosphates, calcium phosphates, iron phosphates, including derivatives and mixtures thereof, is preferred. With respect to 100 parts by weight of wollastonite in the component C, suitable amount of equivalent metal oxide contained in the metal phosphate, i.e., aluminium oxide, zirconium oxide, magnesium oxide, zinc oxide, calcium oxide and iron oxide, is in the range of 2 to 65 parts by weight, with 5 to 47 parts by weight being preferred.

In accordance with this invention, the amount of water employed in the component A should be carefully controlled. Excessive water can convert the resin into a thin mixture that will cause sedimentation of solid particles such as the wollastonite, which leads to an inferior product. Insufficient water will not wet the dry particles adequately to allow the necessary chemical reaction. The amount of water influences on concentration of the reactive components and consequently affects on the pot life and setting process of the resin. The optimal amount of water will depend upon the very metal used in component A and the particular physical characteristics of the constituents of dry particles of this invention, e.g., absorbency, surface area, etc. However, it must be sufficient to adequately wet the dry particles, such as the wollastonite and fillers and/or fibres, to form desirable mixture. This optimal amount of water can be determined on a blend by blend basis. With respect to 100 parts by weight of wollastonite in the component C, the amount of water used can range from about 8 to 150 parts by-weight, with from 11 to 95 parts by weight being preferred. The water content in the component A should include, for purposes of calculation, any water of hydration from the compounds in the component A, B and C.

In accordance with this invention, the component A can be basically prepared by mixing metal and/or metal oxide and/or metal phosphate including hydrates and derivatives thereof in phosphoric acid aqueous solution at a temperature and for a time sufficient to form at least a semi-transparent solution. Sometimes only a particle-liquid suspension is obtained after long time mixing due to such as impurities contained in the raw materials. A filtration process is then required to remove the undesolved portion of particles larger than 1 μm from the solution. The filtered solution can be employed to practise this invention if it contains desired amount of said ingredients. A clear solution homogeneous in molecular level without discrete particle distribution is preferred. It may be with or without color depends on the very metal employed.

In general, the component A of this invention is a mixture composed of various types of phosphate, including but not limited, i.e. orthophosphate, pyrophosphate, and polyphosphate, appeared either alone or in combination thereof. Exact distribution of the different phosphate structures depends on the method and raw materials employed to make the solution, and on the age of the solution. However, a transparent solution with an age of 3 months at 20° C. is found generally sufficient to practice this invention by any person skilled in the art. The component A can be prepared all together as one liquid, or prepared separately and then mixed together as one liquid, or prepared separately and kept separately prior to use.

In accordance with this invention, the component B of this invention is composed of oxy-boron compound including its hydrates. The oxy-boron compound actively participates into the setting reaction, results in the very structure of the fresh resin of this invention with which the pot life can be controlled.

The oxy-boron compound used in this invention generally comprises these boron compounds containing at least one boron-oxygen linkage, hereafter termed the oxy-boron compound. The oxy-boron compound is found specially effective in this invention in terms of producing a extended pot life, avoiding setting expansion and resin over-heating during the setting, i.e., temperature increases to more than 100° C. when free water in the composition boils. These compounds include, e.g., oxy acids of boron which contain one or more boron atoms such as, e.g., boric acid; salts of such acids, such as the alkali metal and alkali earth metal salts thereof, such as sodium borate, calcium borate and amine or ammonium salts thereof such as ammonium borate; and ester of such acids, such a; trialkoxy borate and triaryloxy borate, e.g., trimetal borate. Boron-containing starting materials which yield oxy-boron additives upon contact with phosphate solutions of the component A can be used to generate the oxy-boron compounds in situ. The preferred oxy-boron compound include boric acid, the alkali metal and alkali earth salts of the boric acid such as the sodium borate, calcium borate including their hydrates. The oxy-boron compound can be used as a dry powder or as a solution by dissolving them in water or phosphoric acids. The amount of the component B used in the composition of this invention can vary according to the degree of retardation and the temperature increase desired. Generally, with respect to 100 parts by weight of wollastonite in the component C, the amount of the oxy-boron compound in the mixture, calculated on an anhydrous basis, ranging from about 0.2 to 50 parts by weight, preferably from about 2 to 20 parts by weight being suitable.

In accordance with this invention, the component C is the wollastonite compound including natural and synthetic wollastonite, in calcined or non-calcined state. Usually the commercially available wollastonite is a mineral of natural calcium silicate ($CaSiO_3$) of acicular structure, with a theoretical composition of 48.3% CaO and 51.7% $SiO_2$ by weight. This wollastonite can be classified into two categories of low aspect ratio and high aspect ratio. The low aspect ratio wollastonite, commonly with aspect ratio of not higher than 10, including that of about 1, is mainly used as flux and fillers in ceramic, metallurgical, construction and coating application. The high aspect ratio wollastonite commonly with aspect ratio of 10–20 is used as fibres to produce effect of reinforcement. The most important properties of the wollastonite that affect behavior of the inorganic resin of the present invention are their loss on ignition (LOI), aspect ratio, granulometry, and wollastonite content. Those characteristics can change from one wollastonite to another, depends on its mineral origin, geological history and processing technique to obtain the wollastonite. Setting process of the inorganic resin of the present invention is in one way or another influenced by origin of the wollastonite, which broadly includes factors such as e.g. geological history, way of fabrication and impurities of the wollastonite.

Loss on ignition of the wollastonite is due to release of $CO_2$ when the calcite ($CaCO_3$), which is intimately associated with the wollastonite, is decomposed into $CO_2$ and CaO at high temperatures. To practise this invention, the less amount of associated calcite that can be achieved, the better the wollastonite will be. However, for a practical reason, certain amount of $CaCO_3$ content up to about 5 percent by weight is present in the commercially available wollastonite. High amount of the calcite contained in the wollastonite is not desired, because it will produce excessive $CO_2$ during mixing and reaction stage, which results in internal defects and undermines mechanical strength. High calcite content of the wollastonite will also lead to a long mixing time in order to achieve a homogeneous mixture thus increase difficult for material processing. High amount of the calcite present in the composition may disturb the three component reaction of this invention due to high reactivity between the calcite and the phosphate solution of the component A, which may lead to undesirable reactions and weak structures. One way to completely eliminate the calcite is to heat the commercial available wollastonite in a range of 550–1000° C. until the calcite decomposes to CaO and $CO_2$. The calcination process seems to produce no harmful effect on using the calcined wollastonite in this invention. To practice this invention, the range of the LOI value between 20–1000° C. should not be more than 3 percent by weight. Using a mixture of calcined and non-calcined wollastonite is preferred with which the LOI value can be completely controlled.

Granulometry of the wollastonite plays an important role in controlling pot life and setting time of the inorganic resins of the present invention. When the grain size is too small, the resin will be too reactive and lead to a short pot life. However, when the grain size is too large, only part of wollastonite is able to participate into the reaction so that the necessary constituent to form backbone of the structure is insufficient. Coarse wollastonite will also cause the particle sedimentation from the resin mixture due to its larger specific gravity (about 2.9). However, compared to traditional phosphate cement, this invention permits to use the wollastonite with relatively larger grain size due to the extended pot life, during which period the wollastonite will be decomposed to a satisfactory degree. To practice this invention, the wollastonite used as primary reactant is preferred not larger than 150 $\mu$m. The range of the particle size distribution is given in terms of having a product with preferred properties. Wollastonite with particle size larger than 150 $\mu$m may also be used in the composition as reactive fillers and/or fibres to improve properties of the resin product.

According to the present invention, aspect ratio of the wollastonite used as primary reactant should not be too high to avoid wollastonite fibre from entanglement during mixing which makes the mixing difficult. A preferable aspect ratio is not larger than about 10 which can produce desirable rheology and the wollastonite solubility in the solution of metal phosphate. Wollastonite content of the commercial wollastonite product is preferred to be more than 90 percent by weight. Wollastonite with aspect ratio of larger than about 10, and/or purity less than about 90 percent by weight may be included in general as reactive fillers and/or fibres to reinforce the inorganic resin of the present invention.

In accordance with this invention, inorganic resins of the present invention can be packed and kept separately until prior the use in a three package system. However, a two package system is preferred which comprises a liquid phase and a solid phase. In accordance with this invention, the liquid phase may be composed of the component A and the component B, the solid phase may be composed of the component C. The wollastonite compound may also be partially mixed with the component A, or with the mixture of the component A and component B. The remaining portion of the wollastonite compound is kept separately until prior the use. To practise this two package system, mixing of the component A and the component B can be performed at a temperature and for a time sufficient to form an aqueous solution wherein the oxy-boron compounds are dissolved and incorporated in said metal phosphate. Sometimes a solution with large particle suspension is obtained, then a filtration process is required to remove particles larger than 1 $\mu$m from the solution-provide that all necessary said components is present.

In accordance with this invention, setting process of the inorganic resin or present invention can be controlled by adjusting, such as, liquid/solid weight ratio, water content or the component A, granulometry of the wollastonite. The manner of changing these parameters, whether alone or in combination may depend on various factors such as type of product desired and/or the type of equipment utilised. In accordance with this invention, the setting process can also be adjusted by curing temperatures. High temperatures will increase reactivity of the resin, shorten setting process and produce more exothermic heat; on the other hand; low temperatures will reduce reactivity of the resin and prolong the setting process. This provides a large room for engineers to design and manufacture the composites based on inorganic resin of this invention, which is not possible for the traditional phosphate cements. It can be noted that the true scope and spirit of this invention is to provide a unique composition with controllable pot life for the fresh mixture and good material properties for the hardened resin. This includes both quick setting and extended setting. The few minutes setting time allows for quick repairing work, while the extended pot life permits to make composite materials using various available processing techniques.

In accordance with this invention, inorganic resin composition may be fully cured at ambient temperatures within a limited duration. For example, at 20° C., the resin of this invention may be fully cured within 3 days in terms of developed strength and structural stability. Demoulding may however take place earlier, such as when the resin finally sets. The resin can be cured in an open condition or closed condition, or in combination thereof. Usually the resin shows nearly no setting shrinkage when cured at ambient conditions, profile of any complicated configuration can be copied, and the resin products have a good surface finish. The cured resin has a good resistance against water in terms of the dimension stability and chemical leaching, for instance, being immersed into water, pH value of the water keeps neutral, both the resin and the water is tasteless. Those properties are much similar to that of organic polymer based resin, so that existing processing technique for organic and/or cement composite materials can be employed to make inorganic composite products based on this invention.

In principle, the resin products which are obtained do not require heat curing and may be placed in boiling water without adverse effect. The inorganic resin of the present invention can be placed in a desired configuration, the components interact and harden into a monolithic body with a desired shape. However, curing and/or post curing at high temperatures and high pressures might be recommended to convert the resin into the final structures, when the resin products are destined for use at high temperature and/or in high pressure conditions. In general, the post curing process can further improve material properties of the inorganic resin.

It is found that setting time of the fresh mixture of the present invention can be significantly prolonged at a temperature sufficiently low to retard any setting reactions, so that the mixture remains viscous and/or gel like or as a slurry without setting. Being gradually heated up, such as to ambient temperatures, the resin of this invention will resume its reactivity and set without negative effects on its material properties. A preferred method to practise this nature is to mix the resin composition and then keep the fresh mixture or slurry at the low temperatures. This nature provides a way to store the fresh resin for later use, it reduces waste and makes the resin easy to handle. By contacting the wollastonite compound in the solution of phosphates with the oxy-boron compound for a sufficiently long time, large solid particles of the wollastonite may be decomposed, resulting in a slurry containing much smaller solid particles or even no discrete solid particles. The inorganic resin as a slurry treated at a temperature sufficient low to prevent any setting reaction may be used as a matrix material to make a fibre reinforced composite or prepreg in which the fibres may be well impregnated. In practice, said slurry or said prepreg is then brought on a surface capable of supporting said slurry or said prepreg respectively, the slurry reacting to set as a shaped product of the inorganic resin or said prepreg.

It is observed that the inorganic resin of the present invention has a very good adhesion to other materials such as e.g., metals, organic and inorganic material such as the concrete based on the Portland cement. It has also good adhesion with fibres, such as, e.g., carbon fibres, organic fibres, such as e.g., polyester fibres, mineral fibres, such as, e.g., rockwool, metallic fibres and glass fibres, such as, e.g., E-glass fibres. The good adhesion between fibre and matrix is essential for composite materials to impasse the load from matrix to the fibre, thus increase strength and stability of the composites. With these advantages, inorganic resins of this invention can be used to prepare composite materials reinforced by fibres, such as, i.e., glass fibres.

Aggregate and refractory as long as they do not produce negative effect on material properties, preferably graded sand of mullite, silica, mica, cordierite, silicon carbide, can be included in the dry blend in a controlled amount as filler to make the resin concrete of this invention, for improving performance and reducing cost of the resin product. Fillers can generally enhance the strength of the hardened resin product. Filler usage may range up to about 90 percent by weight of the total composition. Other materials which can be used include particles of competent rocks or rock-forming minerals such as granite, basalt, dolomite, ansesite, feldspar, amphibole, pyroxene, olivine, gabbro, rhyolite, syenite, diorite, dolerite, peridotite, trachyte, obsidian, etc., as well as materials such as slag, fly ash of pulverised coal and that from corundum production, glass cullet, wood whips, and fibrous materials such as metal fibres, glass fibres, organic fibres and natural fibres. When intended to be used at high temperatures, refractory fillers may employed, for instance, the refractory oxides, carbides, nitride, and silicides, such as aluminium oxide, lead oxide, chromic oxide, zirconium oxide or silicate, silica, silicon carbide, titanium nitride, molybdenum disilicide and carnonaceous material such as graphite. In general, these fillers can be with different particle size, and can be both with cellular and non-cellular structures. Mixtures of the fillers can be used, when desired, including mixtures of metals and the ceramics.

Characteristically, hardened resin concrete of this invention is strong and durable. Toughness of the resin product can be achieved by adding fibres. The resin product of present invention has a good resistance against environmental attack, such as freezing (−20° C.)/thawing (20° C.) cycles in terms of mechanical strength and dimension stability of the resin product. The resin product of present invention has also a good resistance against acid attack, such as $H_2SO_4$ solution of pH=1.5. Softening point of the inorganic resin itself is above 1100° C.

It is discovered that, surprisingly, articles based on the inorganic resin of the present invention has a very high surface scratch hardness when abrasion resistant fillers, such as, silicon carbide, boron carbide, corundum, garnet, emery, silica and mixtures thereof, are used. The surface scratch hardness for the resin itself is about 6 Moh in wet and dry condition, but it can be significantly increased to 8.5 Moh or higher in dry condition, and 8 Moh or higher in wet condition when the abrasive grains are included in the inorganic resin composition.

In accordance with this invention, additives such as foaming agents and surfactants can be added to the freshly mixed inorganic resin so that shaped articles with cellular structures with different bulk densities can be produced. In general, carbonates are the suitable species to produce uniform foaming of inorganic resin of this invention, although other foaming agents may also provide satisfactory results. Foaming is caused by $CO_2$ decomposed from carbonates when contacting with acidic phosphate solutions. Carbonates such as $MgCO_3$, $CaCO_3$, $ZnCO_3$, $Li_2CO_3$ and the like, or mixture thereof, which produce relatively insoluble phosphate can be used, with $CaCO_3$ and $MgCO_3$ being preferred. Other carbonates such as $Na_2CO_3$ and $K_2CO_3$ which produce relatively soluble phosphate salts may also be employed where leaching of the phosphate from the product in wet condition is not considered as a problem. The foaming agents can be added to the fresh resin of this invention at any moment before setting, however, they can also be premixed with the component C of this invention. Because the foaming is produced gradually, it is undesirable to have the setting prior to complete foaming. For that reason, this invention is very advantages over traditional phosphate cements to produce cellular structures because of the extended setting. Furthermore, because of the extended pot life, this invention leaves sufficient time to place the fresh mixture of the inorganic resin into any complex mould configuration, so that a foamed resin product with good surface finish can be obtained.

In accordance with this invention, surfactant which is not affected by phosphoric acids may be added into the resin to promote cell stability when making cellular structures. The surfactant may be premixed with the component C of this invention, or added to the freshly formed resin mixture before adding the foaming agent, so that the surfactant can be distributed homogeneously over whole volume of the composition. The surfactant might be, such as, e.g., zinc stereate.

Various pigments, both organic and inorganic as far as their coloring effect is not influenced by phosphoric acids and they have no negative effect on the inorganic resin of this invention, can be added to the resin to have colored resin products. The pigments can be used either as powder or liquid or in combination thereof.

Generally, the inorganic resin of the present invention can be used as a binder both at low and high temperatures. In the field of composite materials, due to the controlled pot life and setting process, fibre reinforced composite can be produced using available material processing, such as, e.g., the hand lay-ups, the spray technique, the extrusion, the pultrusion and the hot pressing, wherein the resin impregnates the fibres and/or fibre mats to form a fibre reinforced product. The product based on inorganic resin of this invention can be strong and tough due both to the resin and function of fibres. The invention is generally applicable as inorganic binder to prepare, like but not limited, as coatings and/or surfacing agents such as e.g. fire resistance and corrosion resistance coatings; adhesives such as to bind metals and/or woods; special cements and concretes, such as dental material, with various characteristics, e.g., high strength and low leachate.

The inorganic resin of present invention can be applied indoors or outdoors to concrete drives, storage yards, warehouse and factory floors to repair and restore damaged surfaces. The resin can be used in the field of roadway construction, roadway patches and building reparation or other load bearing purposes. The characteristics of any particular concrete structures formed can depend on weight ratio of the various compounds, the nature of the aggregate employed, the curing conditions as well as other factors. Due to good adhesion between the inorganic resin of this invention and other cement products, such as that based on the Portland cement, the inorganic resin can be used to fill structure cracks in slabs, and repair highway median barrier walls. This resin can also be used in situation requiring in general a quick, permanent repair of concrete. The resin can be used to make pipes, ducts, moulded configurations in cellular and non-cellular structures; thermal, electrical and/or acoustical insulations; light weight products and the like because of its moisture resistance, high dielectric properties and cellular structures.

The following experiments illustrate various embodiments of the invention. The amounts of the various constituents are given in parts by weight. Other embodiments will be apparent to one of ordinary skill in the art from a consideration of this specification or practice of the invention described therein. It is intended that the specification and experiments are considered as exemplary only, with the true scope and spirit of the invention being indicated by the claims which follow the examples.

As an examplary, a basic resin composition without additives in accordance with this invention is shown in Tab.1.

TABLE 1

| Component A* | | Component B | | Component C | |
| --- | --- | --- | --- | --- | --- |
| $Fe_2O_3$ | 0.7 | $Na_2B_4O_7 \cdot 10H_2O$ | 6.0 | Wollastonite | 70.0 |
| $Al_2O_3$ | 4.3 | | | Calcined wollastonite | 30.0 |
| $ZrO_2$ | 6.3 | | | | |
| ZnO | 13.1 | | | | |
| $P_2O_5$ | 55.3 | | | | |
| $H_2O$ | 57.3 | | | | |

*analytical result.

The component A, expressed by oxide according to oxide analysis, is prepared by dissolving $Fe_2O_3$, $Zr(OH)_4$, granular reagent grade zinc metal, and aluminium pellets in extra pure quality, together with balanced amount of water, in 85% orthophosphoric acid solution by mixing at about 90° C. until a clear solution is obtained. This solution is kept at an ambient temperature of about 20° C. for 6 months before use. The component B is $Na_2B_4O_7 \cdot 10H_2O$, commonly known as borax. It is a dry powder with grain size less than 70 μm and in extra pure quality. The wollastonite of the component C has an aspect ratio of about 5, and 99.5 percent by weight of the wollastonite is not more than about 70 μm. Part of the wollastonite is calcined at 800° C. and kept at 800° C. for a duration sufficient to get all $CaCO_3$ decomposed to CaO and $CO_2$.

In practice of this invention, the component A and component B are firstly pre-mixed together by a mechanical mixer at about 90° C. for about 24 hours to form an aqueous solution. The wollastonite and calcined wollastonite in the component C are also pre-mixed, then added to above mentioned solution and mixed by a planetary mixer at about 20° C. to form a fresh resin of this invention. The composition and procedure to prepare the resin of this invention will be referred as basic resin composition and basic preparation procedure hereafter.

EXAMPLE 1

Examples of controlled pot life and initial setting time are shown in Tab.2.

TABLE 2

| Component A | Component B $Na_2B_4O_7 \cdot 10H_2O$ | Component C | Pot life* | Initial set time |
| --- | --- | --- | --- | --- |
| see Tab.1 | 0 | see Tab.1 | 10 min. | 20 min. |
| see Tab.1 | 2 | see Tab.1 | 20 min. | 1 hour |
| see Tab.1 | 4 | see Tab.1 | 30 min. | 10 hours |
| see Tab.1 | 6 | see Tab.1 | 2.5 hours | 17 hours |
| see Tab.1 | 10 | see Tab.1 | 7 hours | 24 hours |

*the duration in which the resin keeps flowable

The fresh resin is formed by said basic resin composition and basic preparation procedure. Curing of said resin is at an ambient temperature of about 20° C. in a covered condition. The results shown in the Tab.2 illustrate that pot life of the resin can be controlled so that both quick setting and extended setting of the resin can be obtained by addition of the component B. The pot life herein means the duration in which the fresh resin keeps flowable. The composition without the borax has a pot life of only 10 minutes which is too short to further add fillers or fibres, meanwhile the temperature of the mixture increases to more than 100° C. during the reaction and it sets almost instantly. On the other hand, the resins of this invention induce less temperature increase and they are able to harden gradually. In general, more component B is used, less temperature increase, more extended pot life and longer initial setting will be. Further more, inorganic resins of this invention have good surface finish.

EXAMPLE 2

The inorganic resin has said basic inorganic resin composition and is made by said basic preparation procedure. This resin has a pot life of about 2.5 hours and initial setting of about 17 hours at 20° C. in covered condition. The resin gets slightly warm during setting process with free water liberation but no noticeable setting shrinkage or expansion. Being cured at 20° C. for 3 days in a covered condition, the specimen is demoulded and subjected to further drying or wetting before mechanical test. 3-points bending test shows that said resin has an average bending strength of 18.4 MPa, flexural modulus of 13.8 GPa when dried at 20° C. for 3 days; bending strength 12.3 MPa and flexural modulus 12.0 GPa when immersed into water at 20° C. for 3 days.

EXAMPLE 3

Two laminates are prepared by hand lay-ups. The matrix of the first laminate is the resin made from said basic resin composition and said basic preparation procedure, that of the second laminate is the polyester. Each of the laminates is made with 4 layers of the same unidirectional E-glass fibre mat. The laminates are cured at an ambient temperature of ca 20° C. for 24 hrs in covered condition and then post cured at 60° C. for another 24 hours in uncovered condition.

TABLE 3

| Matrix | $V_f$ vol % | Max strain % | Max load N | Modulus GPa measured | $E_f V_f$ GPa calculated |
|---|---|---|---|---|---|
| Inorganic resin* | 14.0 | 1.90 | 7388.9 | 10.2 | 10.6 |
| Polyester | 22.6 | 1.91 | 8659.4 | 17.8 | 17.2 |

*Inorganic resin of this invention

Results of tensile test are shown in the Tab.3, where the strain is a mean value of the strain measured by strain gauge on both sides of the samples; the $V_f$ is the fibre volume fraction, $E_f$ is the modulus of the glass fibre, The $E_f V_f$ is calculated assuming $E_f$=76 GPa. It is observed that, for both laminates, their cracks are spreaded uniformly transversal to the fibre direction after the matrix break, and there is no delamination occurred before final rupture of the fibres.

EXAMPLE 4

The resin has said basic composition and made by said basic preparation procedure. The hardened resin is subjected to the freezing (−20° C.)/thawing (20° C.) cycles for 30 times, the sample shows no noticeable dimension change and cracks.

EXAMPLE 5

The resin has said basic composition and is made by said basic preparation procedure. Additional 200 parts by weight of mullite of 0–0.5 mm is added as filler. Curing is performed in a covered mould at an ambient temperature of 20° C. for 7 days, then demoulded and left uncovered in the ambient condition for 3 days. Scratch hardness on cut surface of the hardened resin is about 8.5, and there is no noticeable crack or dimension change when immersed in $H_2SO_4$ solution of pH=1.5 during 14 days.

EXAMPLE 6

The resin has said basic composition and is made by said basic preparation procedure. The fresh resin is made at an ambient temperature of ca 20° C. and then left at −20° C. immediately. It remains flowable for several days and then gradually evolves to a gel without setting at −20° C.

EXAMPLE 7

Composition of a foamed resin of this invention is shown in Tab.4, it is made by said basic preparation procedure. The surfactant is zinc stereate, the fibre is E-glass fibre. The $MgCO_3$ is added to the resin after other ingredients being mixed. Mixture of this composition foams gradually and sets at 20° C. without applying external heat. The foamed resin is strong and it has a bulk density of about 350 kg/m³ and has uniform cell structures.

TABLE 4

| Component A* | | Component B | | Component C | | Additives | |
|---|---|---|---|---|---|---|---|
| $Fe_2O_3$ | 0.7 | $Na_2B_4O_7 \cdot 10H_2O$ | 2.0 | Wollastonite | 100.0 | $MgCO_3$ | 5.0 |
| $Al_2O_3$ | 4.3 | | | | | Surfactant | 1.0 |
| $ZrO_2$ | 6.3 | | | | | Talc | 10.0 |
| ZnO | 13.1 | | | | | Fibre | 0.5 |
| $P_2O_5$ | 55.3 | | | | | | |
| $H_2O$ | 57.3 | | | | | | |

*analytical result.

What is claimed is:

1. An inorganic resin composition which comprises, in combination, as component A an acidic aqueous solution of metal phosphate containing phosphoric acid, as component B an oxy-boron compound, and as component C a wollastonite compound.

2. The composition according to claim 1, wherein the metal phosphate is selected from the group consisting of an aluminum phosphate, zirconium phosphate, magnesium phosphate, zinc phosphate, calcium phosphate, iron phosphate, and mixtures thereof.

3. The composition according to claim 1, wherein said oxy-boron compound is selected from the group consisting of boric acid and hydrates thereof, an alkali metal and alkaline-earth metal salt of boric acid and hydrates thereof, an amine and ammonium salt of boric acid and hydrates thereof, and mixtures thereof.

4. The composition according to claim 3, wherein said oxy-boron compound is selected from the group consisting of boric acid and hydrates thereof, sodium borate and hydrates thereof, ammonium borate and hydrates thereof, calcium borate and hydrates thereof, and mixtures thereof.

5. The composition according to claim 3, wherein said oxy-boron compound is present in a powder or liquid form.

6. The composition according to claim 1, wherein said wollastonite compound is a natural or synthetic wollastonite, in calcined or non-calcined state, or a combination thereof.

7. The composition according to claim 1, wherein said component A comprises, per 100 parts by weight of said wollastonite compound calculated on a basis of pure calcium silicate in said wollastonite compound:

said metal phosphate in an amount that contains 14 to 135 parts by weight of phosphorous pentoxide and 2 to 65 parts by weight of metal oxide.

8. The composition according to claim 7, wherein said component A comprises:

said metal phosphate in an amount that contains 24 to 86 parts by weight of phosphorous pentoxide and 5 to 47 parts by weight of metal oxide.

9. The composition according to claim 1, wherein a water content of the composition is from 8 to 150 parts by weight per 100 parts by weight of said wollastonite compound calculated on a basis of pure calcium silicate in said wollastonite compound.

10. The composition according to claim 9, wherein the water content is from 11 to 95 parts by weight.

11. The composition according to claim 1, wherein said oxy-boron compound is present, calculated on an anhydrous basis, in an amount of 0.2 to 50 parts by weight per 100 parts by weight of said wollastonite compound calculated on a basis of pure calcium silicate in said wollastonite compound.

12. The composition according to claim 11, wherein said oxy-boron compound, calculated on an anhydrous basis, is present in an amount of 2 to 20 parts by weight.

13. The composition according to claim 6, wherein a particle size and an aspect ratio of the wollastonite are not larger than 150 μm and 10 respectively.

14. The composition according to claim 1, which further comprises an additive selected from the group consisting of fibres, a filler, a foaming agent, a surfactant, a pigment, and a combination thereof.

15. The composition according to claim 14, wherein said surfactant is zinc stearate.

16. The composition according to claim 14, wherein said foaming agent is a carbonate, in a powder form or in an aqueous solution, selected from the group consisting of calcium carbonate, magnesium carbonate, sodium carbonate, potassium carbonate, and a combination thereof.

17. The composition according to claim 14, wherein said filler is silica or a derivative thereof.

18. The composition according to claim 14, wherein said additive is a fibre selected from the group consisting of metal fibre, organic fibre, and non-metal inorganic fibre.

19. The composition according to claim 1, in the form of a cured shape.

20. The composition of claim 18 in the form of a cured, prepreg shape.

21. The composition of claim 18, wherein the fibre is glass fibre.

22. The composition of claim 20, wherein the fibre is glass fibre.

23. A process for preparing an inorganic resin composition in the form of a cured shape, said composition comprising, in combination, as component A an acidic aqueous solution of metal phosphate containing phosphoric acid, as component B an oxy-boron compound, and as component C a wollastonite compound, which process comprises:

mixing said acidic aqueous solution of metal phosphate with said oxy-boron compound at a temperature and for a time sufficient to form a further aqueous solution, contacting said wollastonite compound with the further aqueous solution to form a slurry, and applying said slurry on a surface, wherein said slurry sets to the form of the cured shape of the inorganic resin composition.

24. The process according to claim 23, which further comprises maintaining said slurry at a temperature sufficiently low to retard a setting reaction before being brought on said surface.

25. The process according to claim 23, wherein said surface comprises a fibre mat made of fibres selected from the group consisting of inorganic, organic and/or metallic fibres.

26. The process according to claim 25, whereby applying the slurry on said fibre mat effects impregnating said fibre mat with said slurry, whereby said slurry sets to the form of a cured, fibre reinforced shape.

27. The process according to claim 23, wherein said surface is comprised of metal, organic, or inorganic material.

28. A process for preparing an inorganic resin composition in the form of a cured, prepreg shape, which composition comprises, in combination, as component A an acidic aqueous solution of metal phosphate containing phosphoric acid, as component B an oxy-boron compound, and as component C a wollastonite compound, and which composition further comprises a fibre selected from the group consisting of metal fibre, organic fibre, and non-metal inorganic fibre, which process comprises:

mixing said component A, said component B, said component C to form a slurry, impregnating fibres with said slurry to form a prepreg, maintaining said prepreg at a temperature sufficiently low to prevent curing thereof, and applying said prepreg on a surface that supports said prepreg, wherein the slurry in said fibres sets to the form of the cured, prepreg shape.

29. A method of using an inorganic resin composition comprising incorporating said composition as a binder into a coating or surfacing agent, said composition comprising in combination, as component A an acidic aqueous solution of metal phosphate containing phosphoric acid, as component B an oxy-boron compound, and as component C a wollastonite compound.

30. A method of using an inorganic resin composition, which composition comprises, in combination, as component A an acidic aqueous solution of metal phosphate containing phosphoric acid, as component B an oxy-boron compound, and as component C a wollastonite compound, and which composition further comprises a fibre selected from the group consisting of metal fibre, organic fibre, and non-metal inorganic fibre, said method comprising incorporating said cured prepreg shape into a coating or surfacing agent.

31. The method of claim 30, wherein the shaped form has a foamed structure.

* * * * *